March 20, 1956  A. W. LINDBERG ET AL  2,739,280
FREQUENCY REGULATING SYSTEM
Filed Sept. 15, 1952
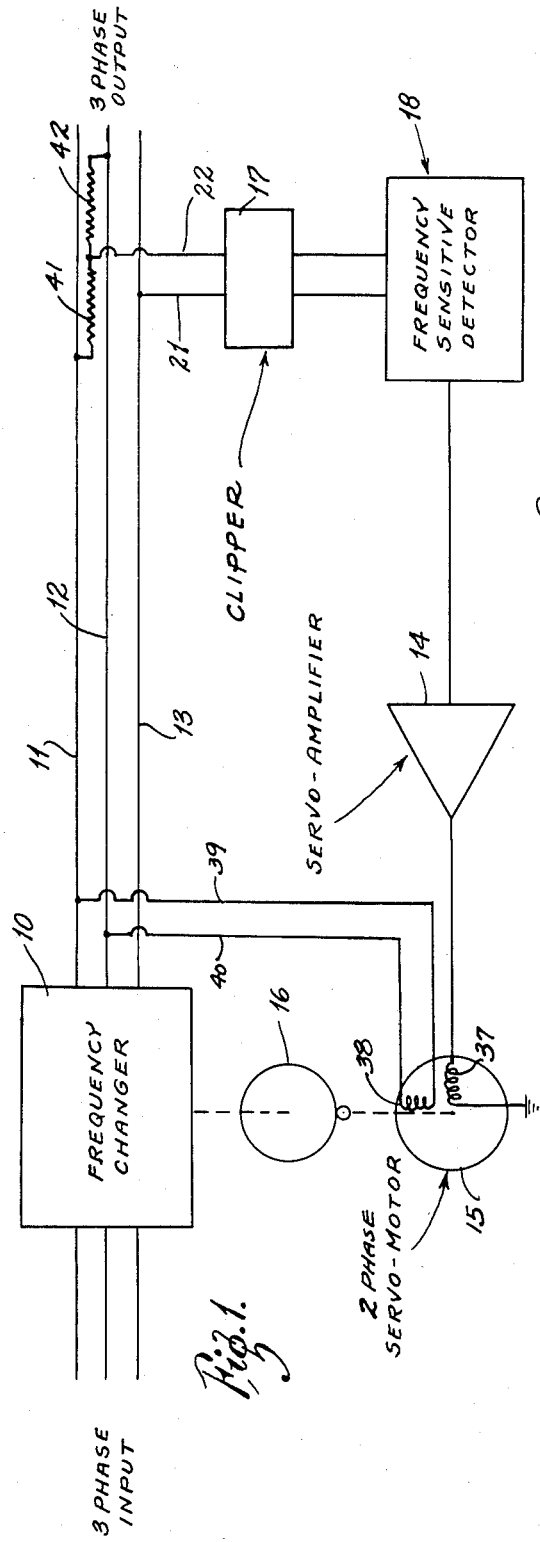
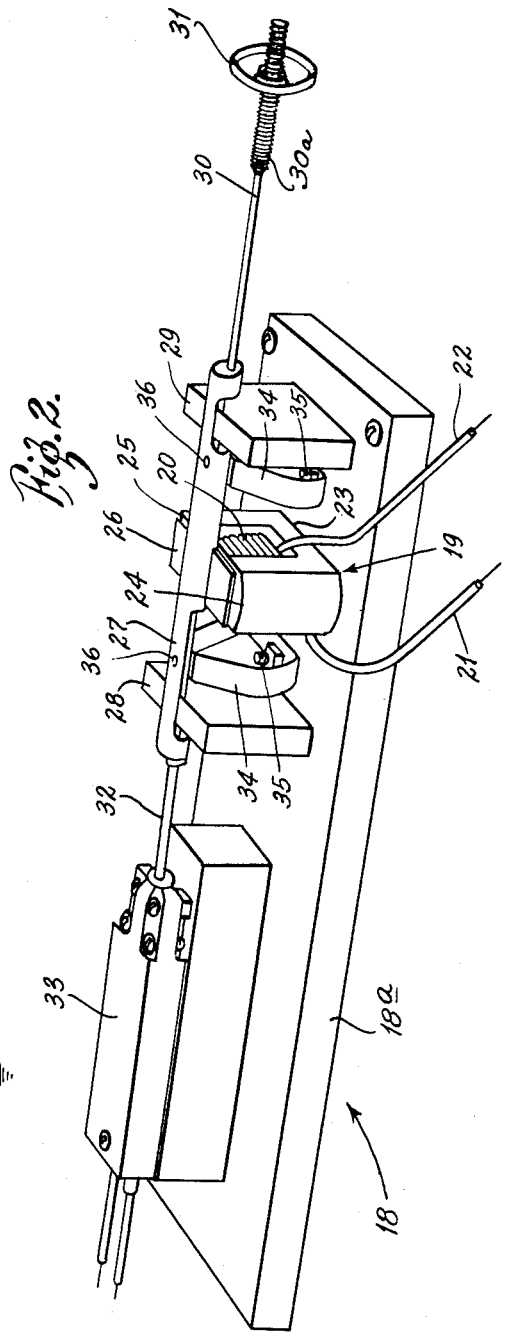
INVENTORS:
ALLAN W. LINDBERG,
ROBERT A. WATSON,
BY Charles E. Markham
THEIR AGENT.

United States Patent Office 2,739,280
Patented Mar. 20, 1956

2,739,280

FREQUENCY REGULATING SYSTEM

Allan W. Lindberg, Webster Groves, and Robert A. Watson, St. Louis, Mo., assignors to Missouri Automatic Control Corporation, St. Louis, Mo., a corporation of Missouri Application September 15, 1952, Serial No. 309,627

5 Claims. (Cl. 318—207)

This invention relates to a system for detecting and correcting frequency variations in an alternating current power supply so as to maintain a power supply of precisely constant frequency.

The system, operating independently of the power supply generator, has particular utility in instances wherein it is desired to utilize a portion of an available power supply having established frequency tolerances for the operation of control systems or the like requiring more precisely constant frequency power for reliable operation. For example, in the operation of control systems which include servo-mechanisms operating with power frequency carriers, reliability is greatly improved and design greatly simplified if power frequency is held sufficiently constant.

The primary object of the present invention is to provide a novel and reliable frequency regulating system capable of precise regulation and which is self-contained and universally adaptable to installation as a unit in an alternating current power supply.

A further object is to provide a frequency regulating system having an induction frequency changer and a feedback loop therefor including a servo-mechanism, wherein changer output frequency error above or below the preselected constant drives the changer toward zero error.

More specifically, it is an object to provide a frequency regulating system employing an induction frequency changer having a wound rotor which is driven in one direction or the other by a two-phase servo-motor thereby to increase or decrease the frequency of its output, and in which is employed a mechanical resonant element acting as the sensitive element in an electro-mechanial detecting circuit arranged so that its output or error signal is at line frequency and passes through zero and a 180° phase reversal when the frequency error goes through zero, and in which this error signal being of correct characteristics is, after suitable amplification, utilized as the controlling phase of the two-phase servo-motor, thereby to drive the frequency changer rotor in the correct direction to minimize frequency error.

A futher object is to provide a generally new and improved frequency sensitive detector particularly adapted to detection of frequency variations in the audio range.

More specifically, the object is to provide a frequency sensitive detector having a motor device driven by line current for producing vibrations at line frequency, a mechanical resonant element having a natural frequency equal to rated line frequency and connected to the motor device so as to restrain these motor vibrations, and a piezo-electric pick-off device arranged so as to be displaced by motor vibrations, whereby a sinusoidal voltage is produced by the pick-off device when line frequency is not at resonance with the mechanical resonant element, and whereby the phase of this signal voltage, due to the action of the resonant element, shifts 180° when line frequency varies from above to below resonance or vice versa, and whereby the phase of this signal voltage leads that of line current by 90° when line current frequency is above resonance and lags it by 90° when its frequency falls below resonance.

These and other objects and advantages which become apparent upon reading the following description in connection with the accompanying drawing are the purposes of the present invention.

In the drawing:

Fig. 1 is a block diagram of a system constructed in accordance with the invention, and Fig. 2 is a perspective view of the frequency sensitive detector.

Referring to Fig. 1 of the drawing, the primary elements of the system are; a frequency changer 10, which is shown connected in the lines 11, 12, and 13 of a three-phase power supply in such manner that the input to the changer is at its left and its output to the right, as indicated, a frequency sensitive detector 18 connected to the output of the frequency changer 10, a servo-amplifying system 14, and a servo-motor 15. A speed reduction drive between the servo-motor 15 and the frequency changer 10 is also indicated at 16, and a conventional clipper, indicated at 17, may also be included for the purpose of eliminating any wave disturbances originating at the power source.

The frequency changer 10 is essentially a polyphase induction motor having distributed stator windings and distributed rotor windings with leads brought to slip rings. The input leads at the left of the changer are connected to its stator windings so as to provide a constant magnitude field rotating at an angular velocity which varies directly with the frequency of the power supply and the output leads to the right of the changer are connected to the slip rings on the rotor. In this type of motor the frequency of the current in the rotor windings depends upon its direction of rotation and its speed. When the wound rotor is held stationary, the output frequency of the changer is equal to the input frequency as in the usual manner of transformation, but when the rotor is rotated, the output frequency of the changer is equal to the algebraic sum of the velocity of the rotating field and the velocity of the rotor.

The frequency sensitive detector 18, see Fig. 2, comprises a base member 18a on one end of which is mounted a special torque motor, generally indicated at 19, which has a winding 20 connected to the output of the frequency changer by leads 21 and 22. The motor further comprises a U-shaped permanent magnet core 23, the vertical legs of which form the poles 24 and 25, and an armature 26 overlying the poles and being pivotally supported thereabove by a rockable shaft 27, whereby a sinusoidal torque is imparted to the shaft 27 at frequency changer output frequency. As a means of pivoting the shaft 27, its ends are milled to form downwardly directed knife edges which rest in V grooves provided in support blocks 28 and 29.

Attached to one end of shaft 27 and extending coaxially therefrom is a rod 30 having a threaded outer end portion 30a on which is mounted a threadedly adjustable disc member 31. The rod 30 and disc 31 together form a torsion pendulum, the natural frequency of which is varied by longitudinal adjustment of the disc 31. Attached to the opposite end of shaft 27 and in coaxial alignment therewith, by a rod 32, is an angular displacement pick-off device 33 of conventional design. As a means of providing a restoring force for the armature 26, a pair of calibrated leaf springs 34 are provided. These springs, being formed in a generally triangular shape, are attached at their bases, as by screws 35, to the base member 18 and at their cut-off apexes to the shaft 27, as by rivets 36. The rod 30 is preferably constructed of metal having a very low coefficient of expansion, such as Invar, and its outer threaded end 30a is of substantially larger diameter than its inner portion. This latter provision, it will be seen, permits a very fine adjustment of the natural frequency of the pendulum because considerably greater longitudinal movement of the disc is required on the increased diameter portion to effect a given frequency change than would be if the rod were of the same diameter throughout.

The action of the torsion pendulum is that of restraining the vibrations generated by the torque motor, and when these vibrations are at resonance with the adjusted frequency of the torsion pendulum, the motion of the torque motor and therefore shaft 27 becomes zero. Under these conditions, there being no angular displacement, a null is reached. When torque motor frequencies are, however, below the tuned frequency of the torsion pendulum, the sinusoidal voltage generated by the pick-off will lag the torque motor impulses by 90°, and when torque motor frequencies are above the tuned frequency of the torsion pendulum, the pick-off output will lead the torque motor impulses by 90°, thereby going through a 180° phase reversal when frequency differential passes through zero.

This phase shift phenomenon is utilized to drive the wound rotor of the frequency changer in a positive direction when line frequency falls below the predetermined constant thereby to increase its output frequency and to drive it in a negative direction to decrease output frequency when line frequency is above the predetermined constant. To accomplish this the output signal of the detector 18 is suitably amplified by the servo-amplifier 14, whereafter it is connected so as to energize the control field winding 37 of the two-phase servo-motor 15 thereby to drive the motor alternately in opposite directions as the phase of the detector error signal shifts 180° that is, from 90° ahead to 90° behind the changer output current or vice versa.

It will be seen that the phase shift of the detector signal voltage referred to above is related to the changer output current, not the E. M. F., and therefore in order to achieve this same relative phase shift between the fixed field flux and control field flux of the servo-motor, it will be necessary to provide a supply for energization of the fixed field, indicated at 38, which is 90° out of phase with the supply energizing the winding 20 of the vibrator motor. To accomplish this, the fixed phase field 38 is connected across changer output leads 11 and 12 by the leads 39 and 40 while the winding 20 is supplied through a T connection comprising like resistors 41 and 42 connected across leads 11 and 12 and the lead 22.

The frequency changer rotor is driven by servo-motor 15 through a suitable gear drive 16. The power supply for the servo-amplifying system 14 is preferably taken from the power supply source ahead of the frequency changer in order to conserve changer output.

In a model constructed by applicants, the frequency changer output was held to within 1 cps. of 400 cps. when the supply frequency was varied from 370 cps. to 430 cps. at fixed load. A measurement of the transient characteristic of the model indicated a response time of approximately ¼ second. Experiments with the constructed model also indicated that sensitivity and response time could be substantially improved and range readily extended by design and proportioning of the elements of the system.

The foregoing description is intended to be illustrative of the principles of the invention and not limiting, the scope of the invention being set forth in the appended claims.

We claim:

1. In a frequency controller, a frequency sensitive detector comprising an electrically operated vibrator for producing vibrations at the frequency and in phase with its energizing current, a mechanical resonant element having a preset natural frequency connected to said vibrator and being capable of restraining said vibrations to the extent that their amplitude is reduced to substantially nil when said vibrations are at resonance with the adjusted frequency of said element, a piezo-electric pick-off device arranged to be displaced by said vibrations when their frequency varies from that of resonance, whereby a signal voltage is produced, the phase of which leads or lags that of the current energizing said vibrator by 90°, a two-phase servo-motor having a control phase field winding, and means for amplifying said signal voltage for the energization of said control phase field winding.

2. In a frequency controller, a frequency sensitive detector comprising an electrically operated motor device for producing torsional vibrations at the frequency and in phase with its energizing current, a torsional pendulum having an adjustable natural frequency connected to said motor for restraining said vibrations to the extent that their amplitude is substantially reduced to zero when at resonance with said pendulum, an angular displacement pick-off device connected to said motor and arranged to be displaced by said vibrations when their frequency varies from resonance, whereby a sinusoidal signal voltage is produced, the phase of which leads or lags that of the current energizing said motor device by 90°, a phase sensitive actuator, and means for amplifying said signal for the energization of said actuator.

3. A frequency detector comprising an electrically operated device capable of producing vibrations having the same frequency as its energizing current, a mechanical resonant element connected to said device, said element having an adjustable natural frequency and being capable of substantially reducing the amplitude of said vibrations to zero when at resonance therewith, and a piezo-electric device connected to said electrically operated device and arranged to be displaced by its vibrations when their frequency varies from resonance with said element, whereby a signal voltage is produced.

4. A frequency detector comprising an electrically operated motor device for producing torsional vibrations at the frequency and in phase with its energizing current, a torsional pendulum connected to said motor device, said pendulum having an adjustable natural frequency and being capable of restraining said motor vibrations to the extent that their amplitude is substantially reduced to zero when at resonance with said pendulum, and an angular displacement pick-off device connected to said motor device and arranged to be displaced by said motor vibrations when their frequency varies from resonance with said pendulum, whereby a sinusoidal signal voltage is produced, the phase of which leads or lags that of the motor vibrations and the motor energizing circuit by 90°.

5. A frequency detector as claimed in claim 4 wherein the torsional pendulum comprises an elongated shaft proportioned so as to vibrate torsionally under conditions of operation, said shaft being connected at its inner end to said motor device and having a longitudinally adjustable disc member at its outer end, said shaft being constructed of a metal having a low coefficient of expansion, and said outer end portion of said shaft whereon said disc is adjustable being of substantially larger diameter so as to permit finer adjustment of the natural frequency of the pendulum.

References Cited in the file of this patent

UNITED STATES PATENTS

| | | |
|---|---|---|
| 1,900,038 | Bower | Mar. 7, 1933 |
| 2,017,894 | Cady | Oct. 22, 1935 |
| 2,260,122 | Moore | Oct. 21, 1941 |
| 2,468,569 | Mead | Apr. 26, 1949 |